B. W. Weaver,
Stump Extractor.
No. 90,038. Patented May 11, 1869.
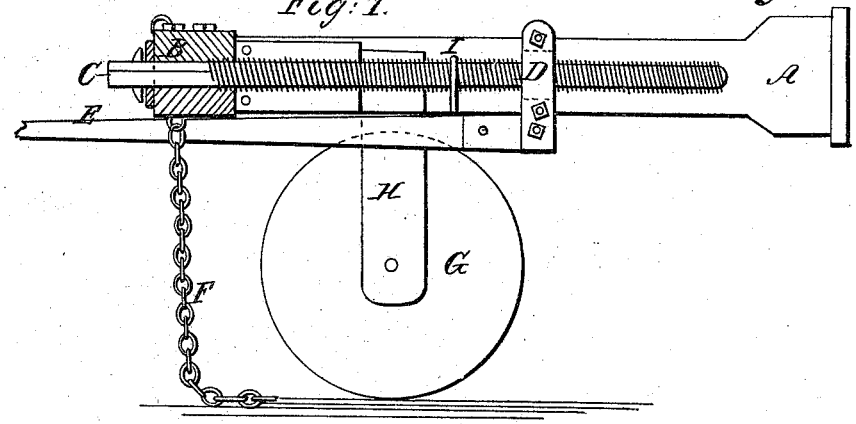
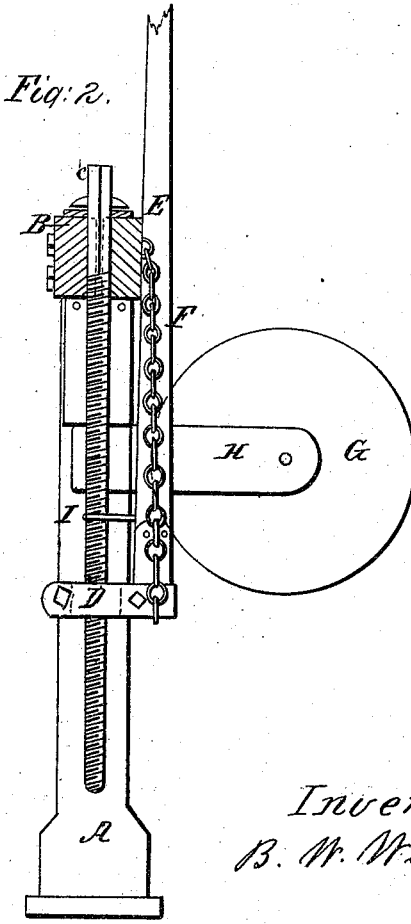
Witnesses:
C. T. Clausen
A. Ruppert
Inventor:
B. W. Weaver
D. P. Holloway & Co

UNITED STATES PATENT OFFICE

BALAH W. WEAVER, OF TRANSITVILLE, INDIANA.

IMPROVED STUMP-EXTRACTOR.

Specification forming part of Letters Patent No. 90,038, dated May 11, 1869.

*To all whom it may concern:*

Be it known that I, BALAH W. WEAVER, of Transitville, in the county of Tippecanoe and State of Indiana, have invented a new and useful Improvement in Stump-Machines; and I do hereby declare that the following is a full, clear, and exact description of the same, reference being had to the annexed drawings, making part of this specification, in which—

Figure 1 is an end view of my improved machine, shown in position for being moved; and Fig. 2 is an end view of the same in position for being used in pulling stumps.

Corresponding letters refer to corresponding parts in both figures.

This invention relates to an improvement in stump-extracting machines; and it consists in the combination and arrangement of its parts, as will be more fully described hereinafter.

A in the drawings represents a post or a vertical portion of the frame, of which there are two, which are to be of the required length to raise the cap or cross-beam B a sufficient distance above the stump to permit of the working of the screw for lifting the same.

B represents a cross-beam or cap, which extends from one post or upright to the other. It may be made in two pieces and bolted to the upper ends of the upright; or it may be of a single piece, and be mortised to receive tenons formed upon the upper ends of said posts.

C represents a screw, which passes down through or between the parts of cross-beam B, and is furnished at its upper end with a strong collar to rest upon a washer to be placed upon said beam, and it is to be square, or of other suitable form, for some distance from its extreme upper end, for the reception of a lever for turning the same. That portion of this screw which extends below the cross-beam alluded to is to be provided with a strong thread for the reception of the nut D, which is used in extracting stumps.

D represents a nut, through which screw C passes, which is to be provided with straps of wrought metal upon each of its two sides, which are opposite the posts of the machine. The straps are to be held in contact with said nut by means of bolts which pass through both and have nuts upon their ends for tightening the same. These nuts and straps serve to hold the chain used in extracting stumps in its position upon the nut, and they also serve to form ears for the reception of the tongue to be used in moving the machine, as will soon be described. These straps are made to serve the last-named purpose by being extended beyond the limits of the nut on one side thereof, and having holes formed therein for the reception of a bolt, which secures such tongue thereto.

E represents the tongue, which is to be secured to the nut, as shown in the drawings, and is to be of sufficient length to extend beyond the frame of the machine far enough to permit of attaching a team thereto for moving such machine.

F represents a chain, which is to be secured to the cross-beam at one of its ends, and is to be used when it is desirable to tip or place the machine in the position shown in Fig. 1. This chain is brought into requisition around the nut D when the machine is in an upright position, and its loose end secured to the beam, which will prevent the nut from turning in moving the machine.

G represents a wheel, of which there are two, one upon each of the posts of the machine, to which they are held by means of the jaws H, which are secured to the frame and extend outward therefrom for a distance sufficient to permit the wheels to rotate therein without coming in contact with the frame.

I represents a staple, which is to be secured to the inner or upper side of the tongue, and is to project therefrom a distance sufficient to allow the screw C to pass through it when the tongue is in position for use.

The operation of my device is as follows: When the machine is in use its position is that shown in Fig. 2, and a chain is to be placed around the nut D and around the stump to be extracted, and the screw so turned as to raise the stump. When it is necessary to remove the machine the tongue is applied by placing the staple around the screw and putting the bolt through the ears of the straps on nut D and through the tongue. This done, the chain is to be placed around the nut, as shown in Fig. 2, when, by pulling upon the upper end of the tongue, the machine will be brought into the position shown in Fig. 1, and mounted upon its wheels, ready to be transported to any desired locality.

Having thus described my invention, what I claim, and desire to secure by Letters Patent, is—

1. The above-described arrangement of the wheels G G with reference to the frame of the machine, as a consequence of which it is rendered capable of being transported from one place to another.

2. The arrangement of the nut D, screw C, tongue E, and chain F, substantially as and for the purpose set forth.

3. The combination of the tongue E, screw C, nut D, and staple I, substantially as and for the purpose set forth.

In testimony whereof I have signed my name to this specification in the presence of two subscribing witnesses.

BALAH W. WEAVER.

Witnesses:
  JASPER M. DRESSER,
  A. S. EMLOVER.